US008572133B2

(12) United States Patent
Duncan et al.

(10) Patent No.: US 8,572,133 B2
(45) Date of Patent: Oct. 29, 2013

(54) SYSTEM FOR IDENTIFYING A SELECTED TARGET IN A GEOGRAPHIC MODEL AND ASSOCIATED METHODS

(75) Inventors: Gilbert Christopher Duncan, Las Cruces, NM (US); Guillermo E. Gutierrez, Haymarket, VA (US); Belinda Villegas, Las Cruces, NM (US)

(73) Assignee: Harris Corporation, Melbourne, FL (US)

( * ) Notice: Subject to any disclaimer, the term of this patent is extended or adjusted under 35 U.S.C. 154(b) by 293 days.

(21) Appl. No.: 12/748,816

(22) Filed: Mar. 29, 2010

(65) Prior Publication Data
US 2011/0238689 A1 Sep. 29, 2011

(51) Int. Cl.
*G06F 17/30* (2006.01)

(52) U.S. Cl.
USPC .......................................................... 707/805

(58) Field of Classification Search
USPC ......... 707/769, 791, 792, 793, 796, 798, 801, 707/802, 803, 804, 805, 807, E17.019, 707/E17.024, 915, 919, 920, 921, 926, 707/999.006, 999.102, 999.107
See application file for complete search history.

(56) References Cited

U.S. PATENT DOCUMENTS

| 5,974,201 A | 10/1999 | Chang et al. .................. 382/305 |
| 7,499,590 B2 | 3/2009 | Seeber .......................... 382/218 |
| 7,603,351 B2 | 10/2009 | Mansfield et al. ................ 707/5 |
| 7,768,526 B2* | 8/2010 | Jungreis et al. ............... 345/619 |
| 2002/0147729 A1* | 10/2002 | Balfour ...................... 707/104.1 |
| 2008/0091732 A1* | 4/2008 | Schmidt et al. ............. 707/104.1 |
| 2009/0138113 A1* | 5/2009 | Hoguet ........................... 700/98 |
| 2010/0287104 A1* | 11/2010 | Leroy ........................... 705/300 |

OTHER PUBLICATIONS

Sallaberry et al., Spatial Information Management within Digital Libraries, Digital Information Management, 2006 1st International Confernece on, Digital Object Identifier: 10.1109/ICDIM.2007. 369238, Publication Year: 2007, pp. 564-475.*

* cited by examiner

*Primary Examiner* — Greta Robinson
(74) *Attorney, Agent, or Firm* — Allen, Dyer, Doppelt, Milbrath & Gilchrist, P.A.

(57) ABSTRACT

A system is for identifying a selected target in a geographic model. The system includes a database configured to store electronically a geographic model, different target model types with respective model-type metadata associated therewith, and different unique targets with unique target metadata associated therewith. A processor cooperates with the database and determines a proposed type-match between a selected target, with selected target metadata associated therewith, and one of the plurality of different target model types stored in the database based upon the selected target metadata and the model-type metadata. The processor also generates updated selected target metadata based upon confirmation of the proposed type-match, and determines a proposed unique target-match between the selected target and one of the different unique targets based upon confirmation of the proposed type-match and based upon the updated selected target metadata and the unique target metadata.

20 Claims, 7 Drawing Sheets

SYSTEM FOR IDENTIFYING A SELECTED TARGET IN A GEOGRAPHIC MODEL AND ASSOCIATED METHODS

FIELD OF THE INVENTION

The present invention relates to the field of image processing, and more particularly, to identifying a target selected from a geographic model and related methods.

BACKGROUND OF THE INVENTION

Topographical models of geographical areas may be used for many different applications. For example, topographical models may be used for flight simulators, urban planning, disaster preparedness and analysis, mapping, and situational awareness (i.e. monitoring a given geographical area of a period of time).

One common topographical model is the digital elevation map (DEM). A DEM is a sampled matrix representation of a geographical area that may be generated in an automated fashion by a computer. In a DEM, coordinate points are made to correspond with a height value.

There are two types of elevation models: a digital terrain model, and a digital surface model. A digital terrain model is also known as a bare earth model, which is a DEM that contains no manmade objects or vegetation. A digital surface model is also known as a reflective surface model, which is a DEM that contains manmade objects and vegetation.

Regions of interest (ROI) are specific objects within an area of interest (AOI) that are being modeled. Regions of interest are also known as regions, and include manmade objects and vegetation, such as buildings, aircraft, boats and different types of terrain.

User demand for three-dimensional (3D) models has grown steadily over the past several years. More recently, the need for "time critical" 3D models for situational awareness has become the more common need. Current model generation methods may not be cost effective and may require a considerable amount of processing time/resources, which makes these products impractical for some users. Indeed, the lengthy turnaround times for 3D models often preclude some situational awareness applications, such as tracking the location of a given vehicle or object, or identifying the vehicle or object.

Attempts at designing image processing applications that track the locations of, and information about, specific regions of interest or objects have been made. For example, U.S. Pat. No. 5,974,201 to Chang et al. discloses an active information system based upon the concept of smart images. Image information or data is provided with an associated knowledge structure, comprising protocols, hot spots, active indexes, and attributes, to thereby provide a smart image or smart images as the base for the active image information system. The smart images provide the system the ability of automating various operations in a given environment, and the images themselves automatically respond to environment changes. The smart images also allow for the active indexing of hot spots, of points of interest. Protocols serve as a user-system interaction model, and the hot spots and active indexes serve as a task model, in the active information system. As a result, the smart image system produces images as active objects with distributed knowledge.

A further attempt at such an image processing application is disclosed in U.S. Pat. No. 7,499,590 to Seeber. Seeber discloses a system for discovering from a database an object which is confusingly similar with a known object. A database is searched for objects which, when discovered, may be duplicated and stored. A determination is then made if any object from the database is confusingly similar with a known object.

Existing systems may not provide adequate analysis of certain image types and geographic models. As such, further image processing systems may be desirable.

SUMMARY OF THE INVENTION

In view of the foregoing background, it is therefore an object of the present invention to create a system to identify a selected target in a geographic model with enhanced accuracy over image analysis alone.

This and other objects, features, and advantages in accordance with the present invention are provided by a system for identifying a selected target in a geographic model. The system includes a database that may be configured to electronically store a geographic model, and a plurality of different target model types with respective model-type metadata associated therewith. The database also stores a plurality of different unique targets with unique target metadata associated therewith. A processor cooperates with the database and may be configured to determine a proposed type-match between a selected target in the geographical model with selected target metadata associated with the selected target, and one of the plurality of different target model types stored in the database. Determining the proposed type-match is based upon the selected target metadata and the model-type metadata.

In addition, the processor generates updated selected target metadata based upon confirmation of the proposed type-match. The processor also determines a proposed unique target-match between the selected target and one of the different unique targets based upon confirmation of the proposed type-match and based upon the updated selected target metadata and the unique target metadata. In some applications, the processor is also configured to generate updated unique target metadata based upon confirmation of the proposed unique target-match.

Determining the proposed type-match and the proposed unique target-match based upon metadata advantageously increases the accuracy of the system over using image analysis alone.

The processor may generate a new unique target based upon rejection of the proposed unique target-match, and may also generate a new target model-type based upon rejection of the proposed type-match. The involvement of a user also increases the accuracy of the system because the user may have certain information that has not yet been stored in the database.

The selected target metadata may comprise at least one of geospatial location data and an acquisition time for the selected target, and the unique target metadata may comprise at least one of geospatial location data and an acquisition time for the unique target. The target model-type metadata may comprise at least one vehicle type and at least one characteristic of the vehicle type. The geographic model may comprise a three-dimensional geospatial model.

In some embodiments, the system may include a plurality of workstations. Each workstation may be configured to present the proposed type-match, accept confirmation or rejection of the proposed type-match, and send confirmation or rejection of the proposed type-match to the processor. Each workstation may also present the proposed unique target-match, accept confirmation or rejection of the proposed unique target-match, and send confirmation or rejection of the proposed unique target-match to the processor. Each workstation may comprise a display, an input device, and a workstation processor cooperating with the display and the input device, for example.

A method aspect is directed to a method of identifying a selected target in a geographic model stored in a database that also stores a plurality of different target model types with respective model-type metadata associated therewith, and a plurality of different unique targets with unique target metadata associated therewith. The method may include determining, using a processor cooperating with the database, a proposed type-match between a selected target, with selected target metadata associated therewith, and one of the plurality of different target model types stored in the database based upon the selected target metadata and the model-type metadata. The method may further comprise generating, using the processor, updated selected target metadata based upon confirmation of the proposed type-match. Additionally, the method may also comprise determining, using the processor, a proposed unique target-match between the selected target and one of the plurality of different unique targets based upon confirmation of the proposed type-match and based upon the updated selected target metadata and the unique target metadata.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
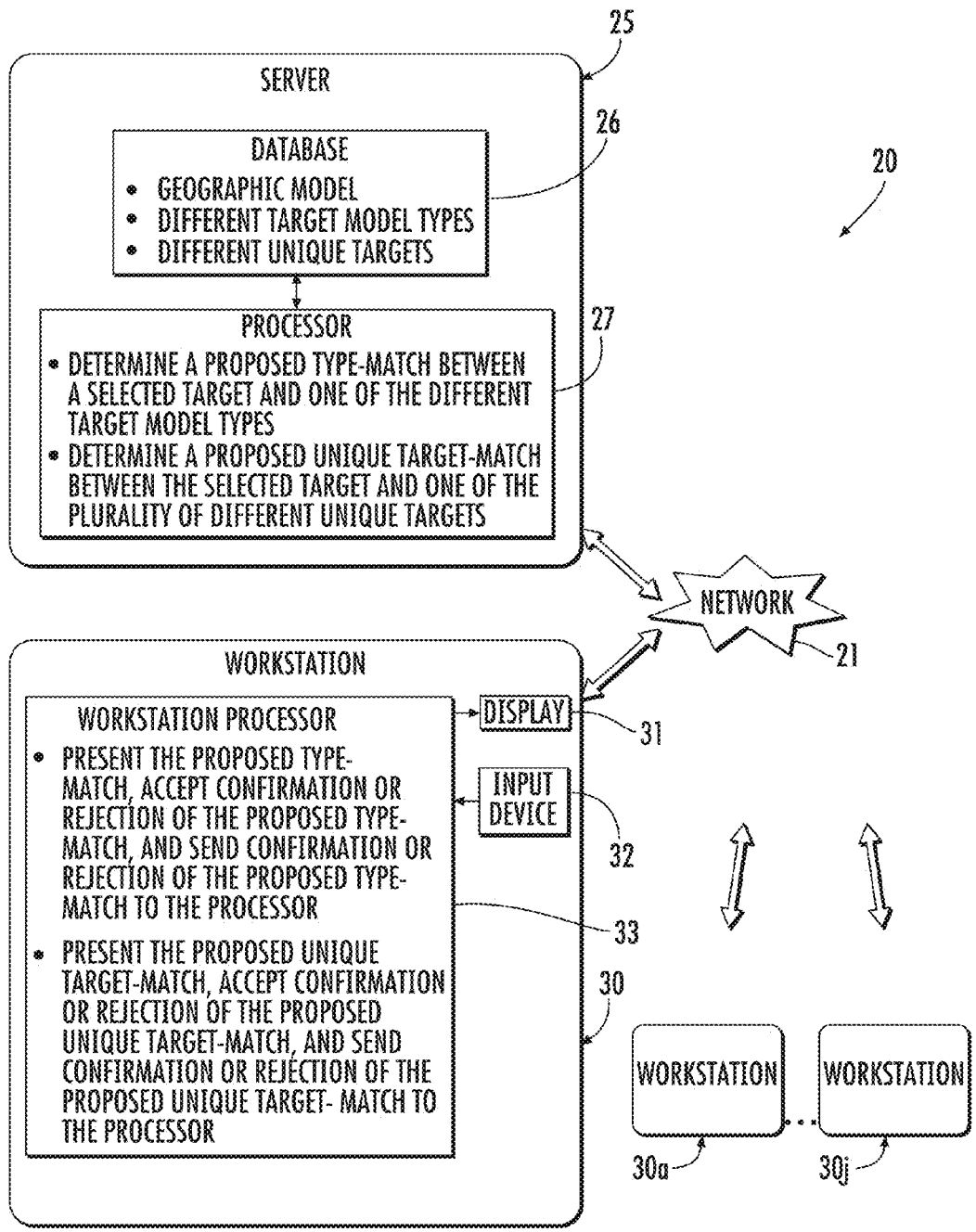
FIG. 1 is a block diagram of a system for identifying a selected target in a geographic model according to the present invention.

Referring initially to FIG. 1, a system 20 for identifying a selected target in a geographic model is now described. The system 20 includes a server 25 comprising a database 26 and a processor 27 coupled to the database. It should be understood that the database 26 may be stored in any suitable memory medium, such as a hard drive, random access memory, etc. The database 26 is configured to store a geographic model. The geographic model may be a three-dimensional digital elevation model (DEM), or other geospatial model, as will be appreciated by one of skill in the art. Moreover, the database 26 may also store one or more micro three-dimensional models of items, vehicles, etc.

The database 26 also stores a plurality of different target model types with respective model-type metadata associated therewith, and a plurality of different unique targets with unique target metadata associated therewith. The target model types and unique targets may be represented by micro three-dimensional models. For ease of explanation, the target is treated as being a vehicle, but it should be understood that the target model types and unique targets may also be building structures, containers, crop fields, and any other object present in the geographic model. The target model types may be different models of helicopters, airplanes, and cars, for example. That is, a MI-24 Hind helicopter may be a target model type. The unique targets correspond to a unique one of the target model types. This, while a target model type may be a MI-24 Hind helicopter, a unique target may be a green MI-24 Hind helicopter having a serial number of NCC-1701.

The model-type metadata associated with a given target model type may include a vehicle type (i.e. helicopter, car, tank, airplane). The model-type metadata may also include characteristics of the vehicle, such as how many rotor blades a helicopter has, the color of the helicopter, or how many axles a truck has, for example. Similarly, the unique target metadata may include an acquisition time, an acquisition sensor identification number and an acquisition sensor type, a geospatial location of the unique target at a given time, the serial number of the vehicle, the paint scheme of the vehicle, etc. Indeed, the unique target metadata may include information to help characterize an individual unique target.

The functioning of the system 20 is now briefly described. The processor 27 of the server 25 determines a proposed type-match between a selected target and one of the different target model types. By way of example, the processor 27 may determine whether the selected target is a MI-24 Hind helicopter.

The processor 27 also determines a proposed unique target-match between the selected target and one of the plurality of different unique targets. Here, for example, the processor 27 determines whether the selected target is the MI-24 Hind helicopter having the serial number NCC-1701.

The system 20 includes a workstation 30. Although only the workstation 30 will be discussed for clarity, it should be understood that there may be any number of workstations 30a . . . 30j. The workstation includes a display 31, an input device 32, and a workstation processor 33. The workstation 30 communicates with the server 25 via a network 21, which may be a local area network, a wide area network, or the Internet, for example. The workstation processor 33 presents the proposed type-match on the display 31 to a user. The workstation processor 33 then accepts confirmation or rejection of the proposed-type match from the user via the input device 32, and sends the confirmation or rejection to the processor 27 of the server 25 via the network 21.

The workstation processor 33 also presents the proposed unique target-match on the display 31 to a user. The workstation processor 33 then accepts confirmation or rejection of the proposed unique target-match from the user via the input device 32, and sends the confirmation or rejection to the processor of the server 25 via the network.

The addition of a human in the determination of whether a target matches a proposed target type or whether a target matches a proposed unique target may advantageously increase the accuracy of the system 20, as the user may be aware of additional information not stored in the database 26.

After it has received confirmation or rejection of the proposed unique target-match from the user via the input device 32, the workstation processor 32 may query the user about his satisfaction with the results. If the customer indicates that he is not happy, a data producer who has generated the different unique targets and/or different target model types may then be alerted. This way, the data producer can preemptively contact a customer about his dissatisfaction with the data available or the results, eliminating a user's need to proactively contact that entity.

Figure 2:
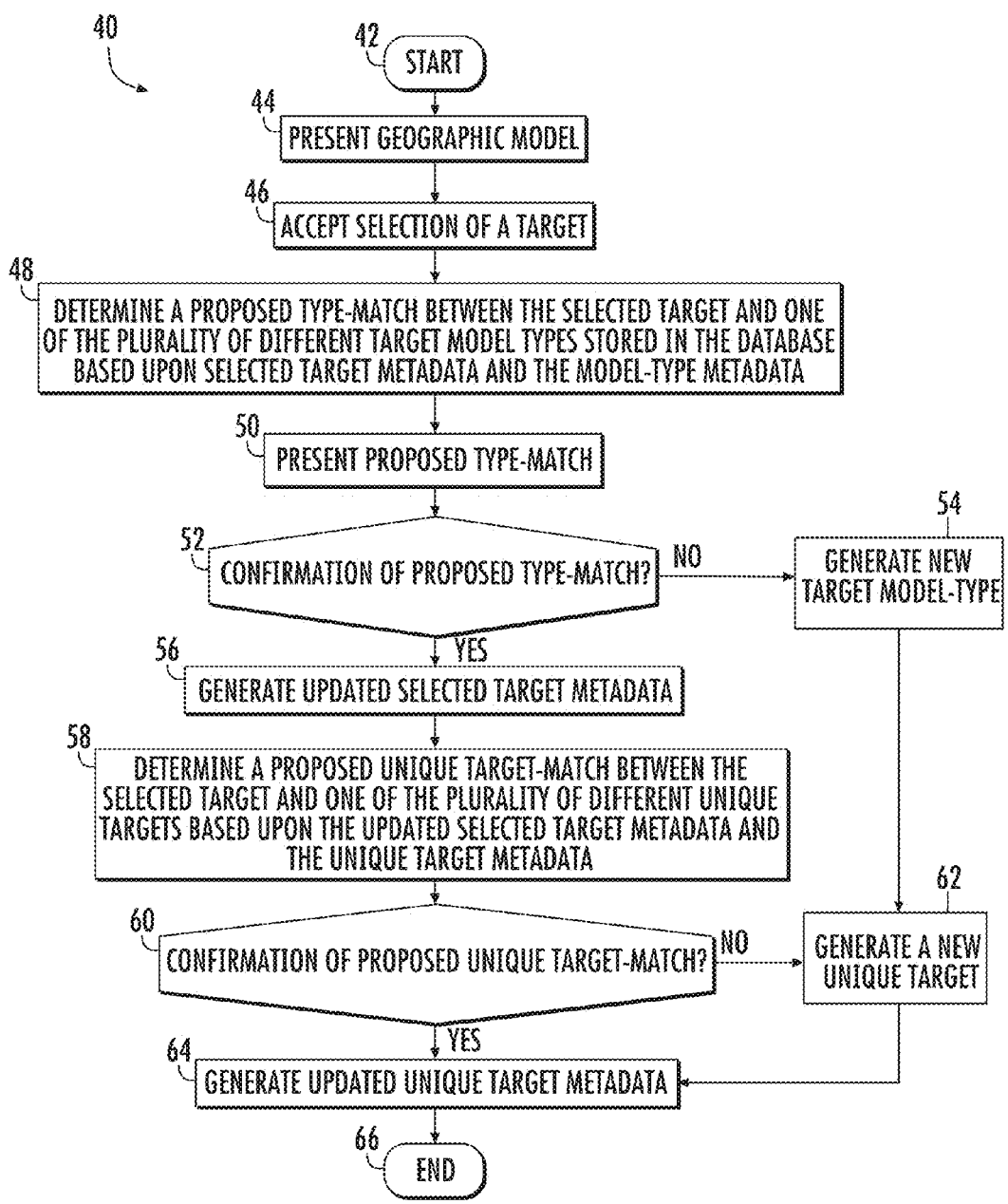
FIG. 2 is a flowchart illustrating the operation of the system of FIG. 1.

The operation of the system 20 is now described in greater detail with reference to the flowchart 40 of FIG. 2. After the start of operation (Block 42), at Block 44 the geographic model is presented to the user via the display 31 of the workstation 33. At Block 46, selection of a target is accepted via the input device 32 of the workstation 33.

Figure 3:
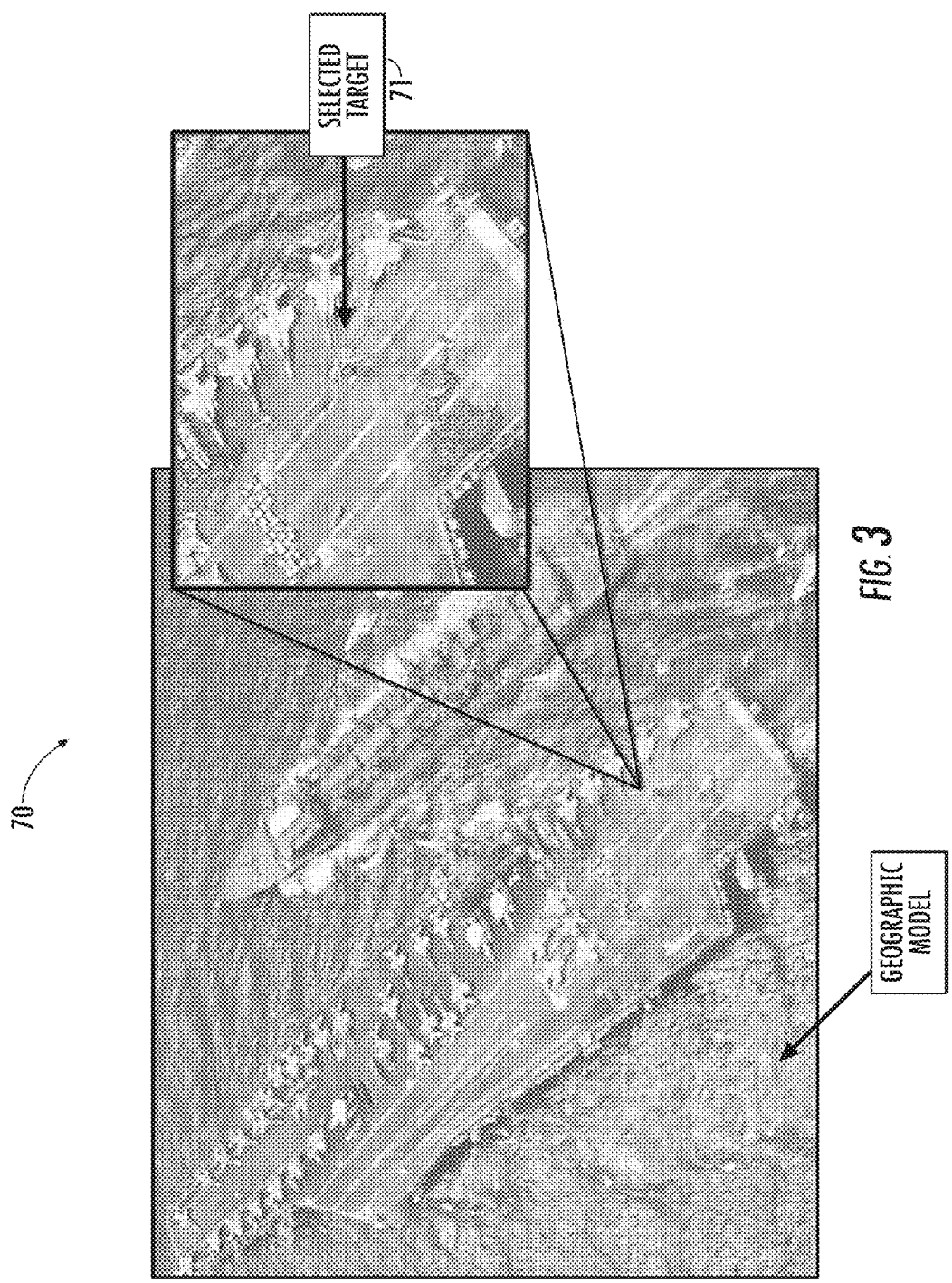
FIG. 3 is a sample display of the workstation of FIG. 1 during target selection.

A sample display 70 of the geographic model, together with selection of a target 71, is shown in FIG. 3. Here, the geographic model is a portion of the ocean through which an aircraft carrier and a support ship are traveling. The selected target 71 is illustratively a helicopter on the deck of the aircraft carrier, but could have been the aircraft carrier itself or any object on the surface thereof. Similarly, the selected target could have been the support ship itself or any object on the surface thereof, however in this instance, the user chose the helicopter. The target may be selected by "drawing" an outline thereabout, in some applications. In other applications, the target may be selected by drawing a box therearound.

At Block 48, a proposed type-match between the selected target and one of the plurality of different target model types stored in the database 26 is determined. It should be understood that this determination may be based upon the metadata of the selected target and the metadata of the model-type, but may also be further based upon a variety of image analysis techniques. For example, the determination of the proposed type-match may be made based upon a given number of matches of metadata points of the selected target and one of the plurality of different target model types.

Figure 4:
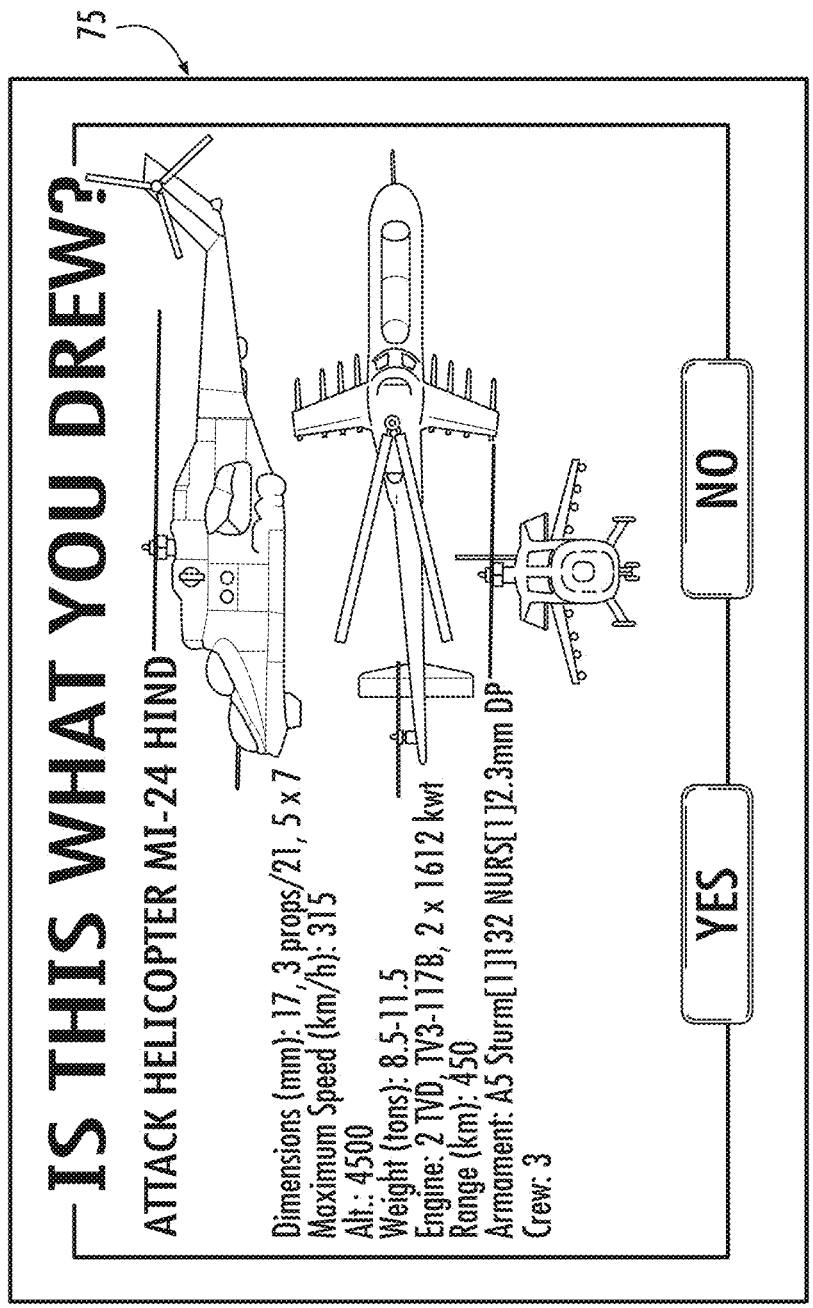
FIG. 4 is a sample display of the workstation of FIG. 1 presenting a proposed type-match.

At Block 50, the proposed type-match is presented to the user via the display 31 of the workstation 33. A sample display 75 of presentation of the proposed type-match is shown in FIG. 4. Here, the user is queried whether he selected or "drew" a MI-24 Hind Attack Helicopter, the schematics of which are displayed. At Block 52, confirmation of the proposed type-match is received via the input device 32. If the user rejects the proposed type-match (i.e. clicked "NO" on the display 75), a new target model-type will be generated at Block 54. Thereafter, a new unique target of the new target model-type will be generated at Block 62.

Figure 5:
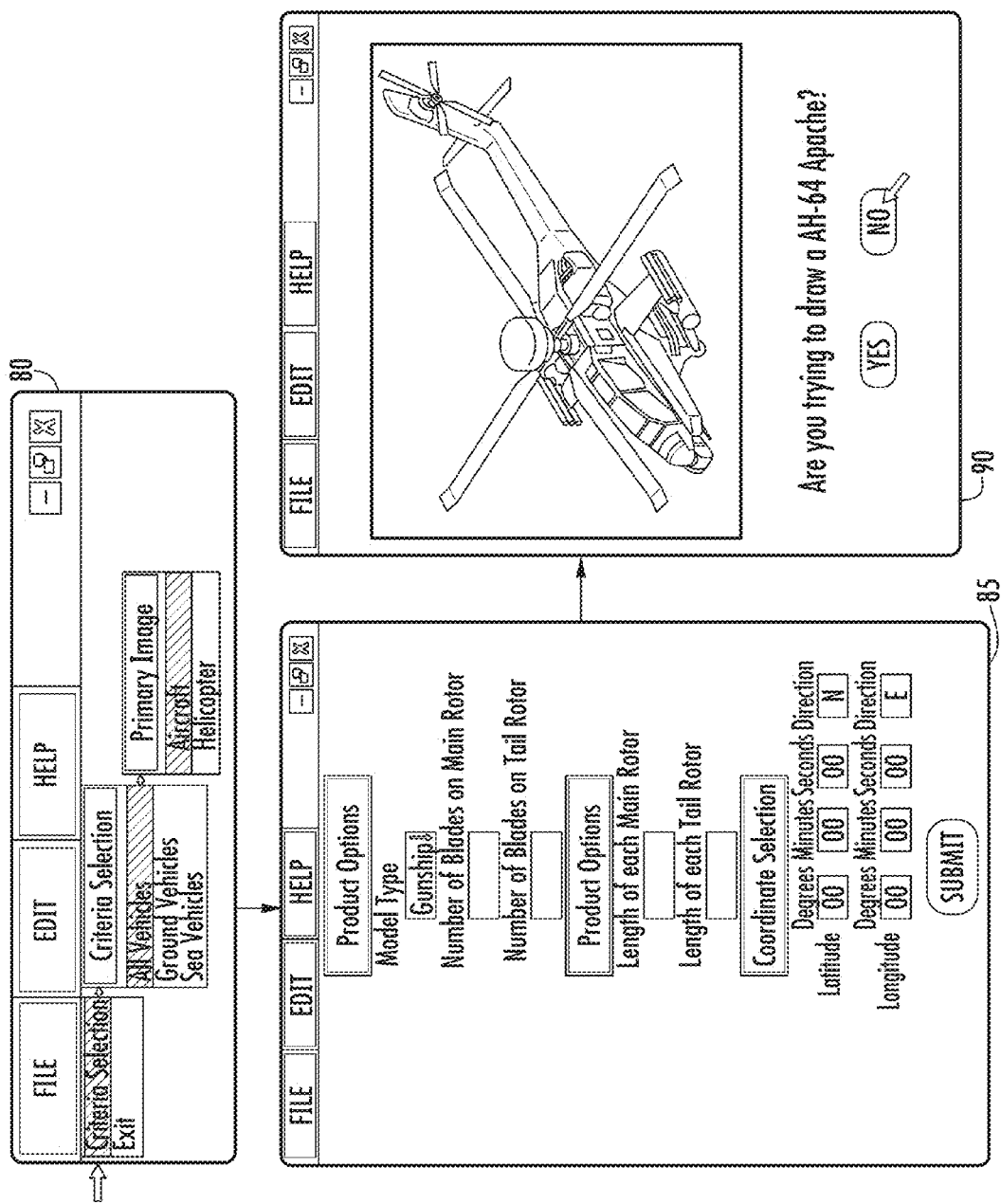
FIG. 5 is a sample display of the workstation of FIG. 1 during generation of a new target model-type.
Figure 6:
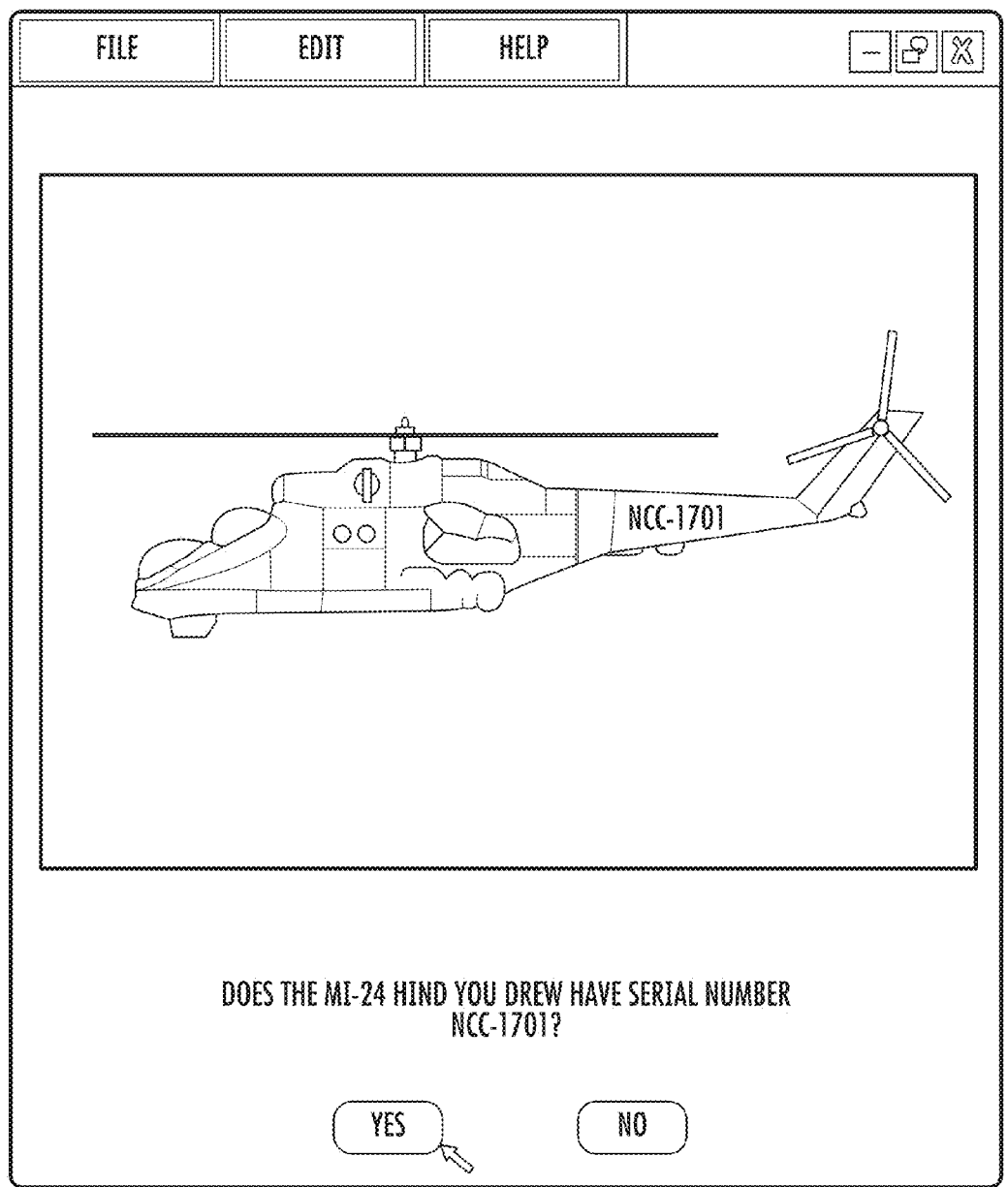
FIG. 6 is a sample display of the workstation of FIG. 1 presenting a proposed unique target-match.

Shown in FIG. 5, is an initial sample display 80 of generation of the new target-model type. Here, the user is selecting Air Vehicles from a variety of criteria, and is selecting between an Aircraft and a Helicopter. As shown in the display 85, the user ultimately selected Helicopter, and is now entering further information about the helicopter (i.e. model type, number of blades on main rotor, number of blades on tail rotor, etc). Sample display 90 illustrates the system suggesting a new target model-type matching an existing target model type based upon the information entered. The user is queried whether he is trying to draw an AH-64 Apache.

If the user confirms the proposed type-match, updated selected target metadata is generated at Block 56. This updated selected target metadata may include modifications to the target model type. For example, the target model type of a MI-24 Hind helicopter may have one main rotor assembly with five rotor blades attached thereto. The selected target may have one main rotor assembly with six rotor blades attached thereto. However, based upon other matches between the metadata of the selected target and the target model type, the proposed type-match may be that the selected target is a MI-24 Hind. If the user confirms this proposed type-match, the metadata of the target model type for the MI-24 Hind will be updated to reflect that it may have one main rotor assembly with either five or six rotor blades.

At Block 58, a proposed unique target-match is determined between selected target and one of the plurality of different unique targets. The proposed unique target-match may be determined based upon the updated selected target metadata and the unique target metadata, but may also be determined based upon a variety of image analysis techniques. For example, an image registering technique may be performed on the selected target and the unique target to thereby correlate the selected target and the unique target at a pixel level.

Confirmation of the proposed unique target-match is received via the input device 32 at Block 60. A sample display 95 of presentation of the proposed unique target-match is shown in FIG. 5. Here, the user is queried whether the MI-24 Hind he drew has the serial number NCC-1701. If the user rejects the proposed unique target-match (i.e. clicked "NO" on the display 95), a new unique target will be generated at Block 62.

If the user confirms the proposed unique target-match, updated unique target metadata will be generated at Block 64. This updated unique target metadata may include modifications to the unique target. For example, the unique target may have a target model type of a MI-24 Hind helicopter. The MI-24 Hind target type may allow for one main rotor assembly with five or six rotor blades attached thereto. The updated unique target metadata may include the fact that this particular MI-24 Hind has six rotor blades and not five. Similarly, the updated unique target metadata may include the fact that this particular MI-24 Hind has been repainted and has a new color scheme. Thus, if the user confirms this proposed unique target-match, the metadata of the unique target will reflect that this particular MI-24 hind has six rotor blades and is painted a given color scheme.

It should be noted that since multiple users may use the system 20, the system may receive input from multiple users about a given proposed target type or proposed unique target. This helps to further update the selected target metadata and unique target metadata. Block 66 indicates the end of operation.

In some applications, the workstation 30 may accept user input of a new unique target even when no target has been selected. For example, if the user would like to locate a brown Ford F-150 with a license plate number of "XYZ 123," the user can input that new unique target into the workstation 30 via the input device 32. The workstation may communicate this new target model type to the server 25 via the network 21. If a user on another workstation 30a . . . 30j selects a target, the model type of which is identified as a Ford F-150, the target will be checked to determine whether it is the new unique target (brown Ford F-150 with license plate "XYZ 123.") If the selected target matches the new unique target, the user of the workstation 30 will be notified.

Similarly, multiple interested users (which can be referred to a community of interest) can notify the server 25 that they are interested in particular types of objects (i.e. pickup trucks), or even a particular pickup truck (i.e. brown Ford F-150 with license plate "XYZ 123,"). When any user selects a target matching such an object of interest via a workstation 30a . . . 30j, the server 25 may then alert each interested user of the community of interest via their respective workstation.

This may advantageously help a user locate a desired unique target without expending excessive computing resources.

Furthermore, the server 25 may notify other workstations the user of the workstation 30 that a user on another workstation 30*a* . . . 30*j* has selected Indeed, this may allow a user to alert a community that is interested in certain types of objects (i.e. pickup trucks), or of particular objects (Ford F-150 pickup trucks with the license plate "XYZ 123,")

Figure 7:
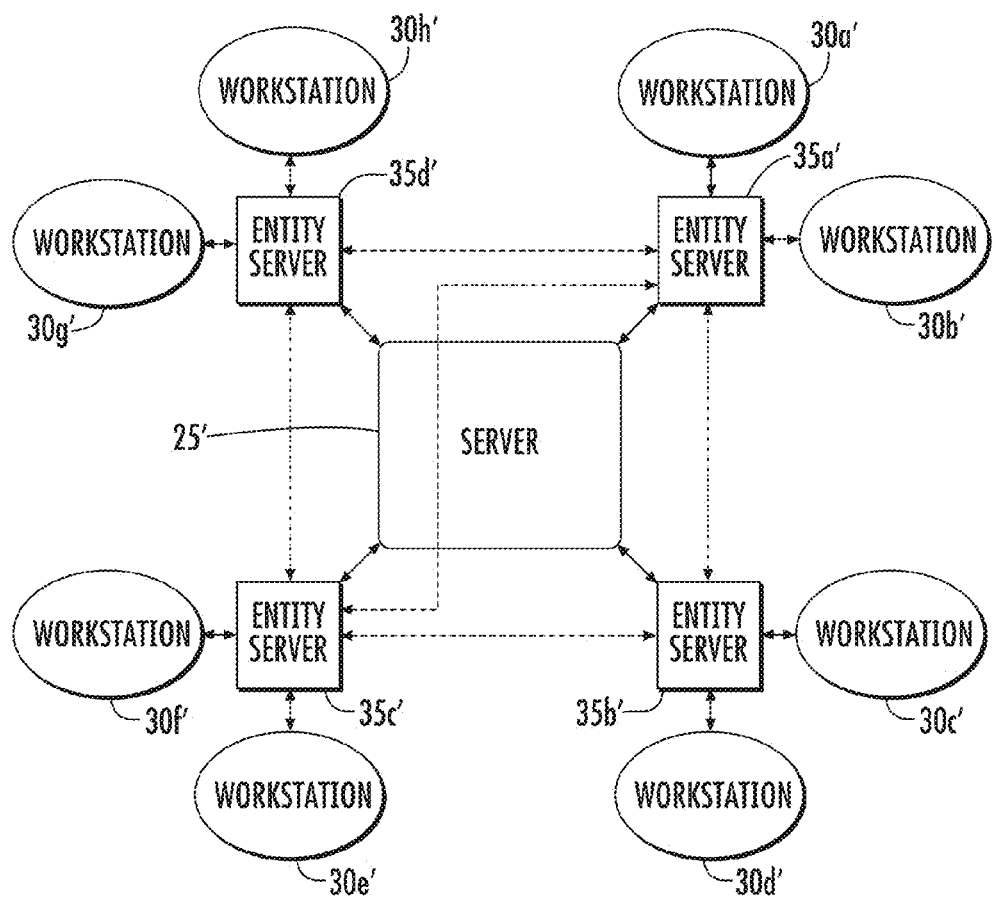
FIG. 7 is a block diagram of a potential network configuration of a system for identifying a selected target in a geographical model according to the present invention.

Another network configuration for the system 20' is now described with reference to FIG. 7. Here, there are four entity servers 35*a*'-35*d*' in communication with the main server 25', each entity server having two workstations 30*a*' . . . 30*h*' coupled thereto. In this configuration, each entity server 35*a*'-35*d*' is capable of performing the same functions as the server 25', as described above.

The entity servers 35*a*'-35*d*' also store geographical data, different target model types, and different unique targets. This geographical data, different target model types, and different unique targets stored by the entity servers 35*a*'-35*d*' may be a subset of those stored on the server 25', or may be a separate and distinct set of geographical data, different model types, and different unique targets. This may be done because it may not be desirable for one entity server 35*a*' to have access to the unique targets of another entity server 35*b*'. Of course, at a later point in time, the entity servers 35*a*'-35*d*' may share their geographical data, different target model types, and different unique targets with the server 25'. In addition, one entity server 35*c*' may share its unique targets with another entity server 35*d*' so those entities may work together in selecting targets.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for identifying a selected target in a geographic model comprising:
a database configured to electronically store
a geographic model,
a plurality of different target model types with respective model-type metadata associated therewith, and
a plurality of different unique targets with unique target metadata associated therewith; and
a processor configured to accept selection of a target in the geographic model and to cooperate with said database to
determine a proposed type-match based on image analysis techniques between the selected target in the geographic model, with selected target metadata associated with the selected target, and one of the plurality of different target model types stored in said database based upon the selected target metadata and the model-type metadata,
generate updated selected target metadata based upon confirmation of the proposed type-match, and
determine a proposed unique target-match based on image analysis techniques between the selected target and one of the plurality of different unique targets based upon confirmation of the proposed type-match and based upon the updated selected target metadata and the unique target metadata.

2. The system of claim 1 wherein said processor is also configured to generate updated unique target metadata based upon confirmation of the proposed unique target-match.

3. The system of claim 2 wherein said processor is also configured to generate a new unique target based upon rejection of the proposed unique target-match.

4. The system of claim 2 further comprising a plurality of workstations, each configured to:
present the proposed type-match, accept confirmation or rejection of the proposed type-match, and send confirmation or rejection of the proposed type-match to said processor; and
present the proposed unique target-match, accept confirmation or rejection of the proposed unique target-match, and send confirmation or rejection of the proposed unique target-match to said processor.

5. The system of claim 4 wherein each workstation comprises:
a display;
an input device; and
a workstation processor cooperating with said display and said input device.

6. The system of claim 1 wherein said processor is also configured to generate a new target model-type based upon rejection of the proposed type-match.

7. The system of claim 1 wherein the selected target metadata comprises at least one of geospatial location data and an acquisition time for the selected target.

8. The system of claim 1 wherein the unique target metadata comprises at least one of geospatial location data and an acquisition time for the unique target.

9. The system of claim 1 wherein the target model-type metadata comprises at least one vehicle type and at least one characteristic of the at least one vehicle type.

10. The system of claim 1 wherein the geographic model comprises a three-dimensional geospatial model.

11. A system for identifying a selected target in a geographic model comprising:
a database configured to electronically store
a geographic model comprising a three-dimensional digital model,
a plurality of different target model types with respective model-type metadata associated therewith, and
a plurality of different unique targets with unique target metadata associated therewith;
a processor configured to accept selection of a target in the geographic model and to cooperate with said database to
determine a proposed type-match based on image analysis techniques between the selected target in the geographic model, with selected target metadata associated with the selected target, and one of the plurality of different target model types stored in said database based upon the selected target metadata and the model-type metadata,
generate updated selected target metadata based upon confirmation of the proposed type-match,
determine a proposed unique target-match based on image analysis techniques between the selected target and one of the plurality of different unique targets based upon confirmation of the proposed type-match and based upon the updated selected target metadata and the unique target metadata, and
generate updated unique target metadata based upon confirmation of the proposed unique target-match; and
a plurality of workstations, each configured to
present the proposed type-match, accept confirmation or rejection of the proposed type-match, and send confirmation or rejection of the proposed type-match to said processor, and present the proposed unique target-match, accept confirmation or rejection of the proposed unique target-match, and send confirmation or rejection of the proposed unique target-match to said processor.

12. The system of claim 11 wherein said processor is also configured to generate updated unique target metadata based upon confirmation of the proposed unique target-match.

13. The system of claim 11 wherein said processor is also configured to generate a new unique target based upon rejection of the proposed unique target-match.

14. The system of claim 11 wherein said processor is also configured to generate a new target model-type based upon rejection of the proposed type-match.

15. A method of identifying a selected target in a geographic model electronically stored in a database also electronically storing a geographic model, a plurality of different target model types with respective model-type metadata associated therewith, and a plurality of different unique targets with unique target metadata associated therewith, the method comprising:
operating a processor cooperating with the database to accept selection of a target in the geographic model, and to use determine a proposed type-match based on image analysis techniques between the selected target in the geographical model, with selected target metadata associated therewith, and one of the plurality of different target model types stored in the database based upon the selected target metadata and the model-type metadata;
operating the processor to generate updated selected target metadata based upon confirmation of the proposed type-match; and
operating the processor to determine a proposed unique target-match based on image analysis techniques between the selected target and one of the plurality of different unique targets based upon confirmation of the proposed type-match and based upon the updated selected target metadata and the unique target metadata.

16. The method of claim 15 further comprising generating, using the processor, updated unique target metadata based upon confirmation of the proposed unique target-match.

17. The method of claim 16 further comprising generating, using the processor, a new unique target based upon rejection of the proposed unique target-match.

18. The method of claim 16 further comprising:
presenting, using a workstation, the proposed type-match, accepting confirmation or rejection of the proposed type-match, and sending confirmation or rejection of the proposed type-match to the processor; and
presenting, using the workstation, the proposed unique target-match, accepting confirmation or rejection of the proposed unique target-match, and sending confirmation or rejection of the proposed unique target-match to the processor.

19. The method of claim 15 further comprising generating, using the processor, a new target model-type based upon rejection of the proposed type-match.

20. The method of claim 15 wherein the selected target metadata comprises at least one of geospatial location data and an acquisition time for the selected target; and wherein the unique target metadata comprises at least one of geospatial location data and an acquisition time for the unique target.

* * * * *